(12) United States Patent
Kofler

(10) Patent No.: US 8,086,201 B2
(45) Date of Patent: Dec. 27, 2011

(54) DIVERSITY RECEIVING DEVICE

(75) Inventor: Heinrich Kofler, Wien (AT)

(73) Assignee: AKG Acoustics GmbH, Vienna (AT)

( * ) Notice: Subject to any disclaimer, the term of this patent is extended or adjusted under 35 U.S.C. 154(b) by 380 days.

(21) Appl. No.: 12/487,024

(22) Filed: Jun. 18, 2009

(65) Prior Publication Data

US 2010/0015934 A1 Jan. 21, 2010

(51) Int. Cl.
*H04B 1/06* (2006.01)
*H04K 3/00* (2006.01)

(52) U.S. Cl. ........................................ 455/273; 455/137

(58) Field of Classification Search .................. 455/132, 455/134–138, 272–273, 277.1–277.2; 375/347
See application file for complete search history.

(56) References Cited

U.S. PATENT DOCUMENTS

| | | | |
|---|---|---|---|
| 5,697,075 A | 12/1997 | Kim | |
| 6,871,054 B2 | 3/2005 | Kenkel et al. | |
| 7,116,952 B2 | 10/2006 | Arafa | |

FOREIGN PATENT DOCUMENTS

| | | |
|---|---|---|
| DE | 2 318 260 A1 | 10/1973 |
| DE | 35 36 826 | 4/1987 |
| DE | 601 11 765 T2 | 5/2006 |
| DE | 20 2006 007 918 U1 | 11/2006 |
| EP | 1 562 309 A2 | 8/2005 |
| JP | 61-073437 | 4/1986 |
| JP | 2-062131 | 3/1990 |
| JP | 2-305234 | 12/1990 |
| JP | 8-107306 | 4/1996 |
| JP | 10-163941 | 6/1998 |
| JP | 2003-133319 | 5/2003 |
| WO | WO 0067395 | 11/2000 |

OTHER PUBLICATIONS

Doherty, W. E. Jr. et al., *The Pin Diode Circuit Designers' Handbook*, printed from the internet at http://www.microsemi.com/literature/pinhandbook.pdf, Microsemi Corporation, 1998, 137 pages.

*Primary Examiner* — Lee Nguyen
(74) *Attorney, Agent, or Firm* — Brinks Hofer Gilson & Lione

(57) ABSTRACT

A diversity receiving device includes two signal paths. Each path interfaces an antenna that receives a radio frequency signal and an amplifier that amplifies the received radio frequency signal. A variable signal level attenuator in each path attenuates the amplified signal and receives current from current sources. The current sources are coupled to the amplifiers through variable signal level attenuators. The variable signal level attenuators are in parallel with controllable bypass lines which comprise variable resistance elements. The two signal paths are combined into a common path.

22 Claims, 8 Drawing Sheets

DIVERSITY RECEIVING DEVICE

PRIORITY CLAIM

This application claims the benefit of priority from International Application No. PCT/EP2006/012228, filed Dec. 19, 2006, which is incorporated by reference.

BACKGROUND OF THE INVENTION

1. Technical Field

The disclosure relates to a diversity receiving device and more particularly to systems that combine signal paths.

2. Related Art

A diversity system may include two identical signal paths. The signal paths may feed separate receivers. Because of the separate signal paths, a higher demodulated signal may be needed and may requires more components, cost more to assemble, and may consume more power.

In a mobile environment, increased power consumption may affect data retention and mobile features for an extended period of time. In some systems, two signal paths may source a common receiver. Depending on the signal strength, an active antenna may be selected. In these systems, dropouts may not be avoided and may not be energy efficient.

SUMMARY

A diversity receiving device includes two signal paths. Each path interfaces an antenna that receives a radio frequency signal and an amplifier that amplifies the received radio frequency signal. A variable signal level attenuator in each path attenuates the amplified signal and receives current from current sources. The current sources are coupled to the amplifiers through variable signal level attenuators. The variable signal level attenuators are in parallel with controllable bypass lines which comprise variable resistance elements. The two signal paths are combined into a common path.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
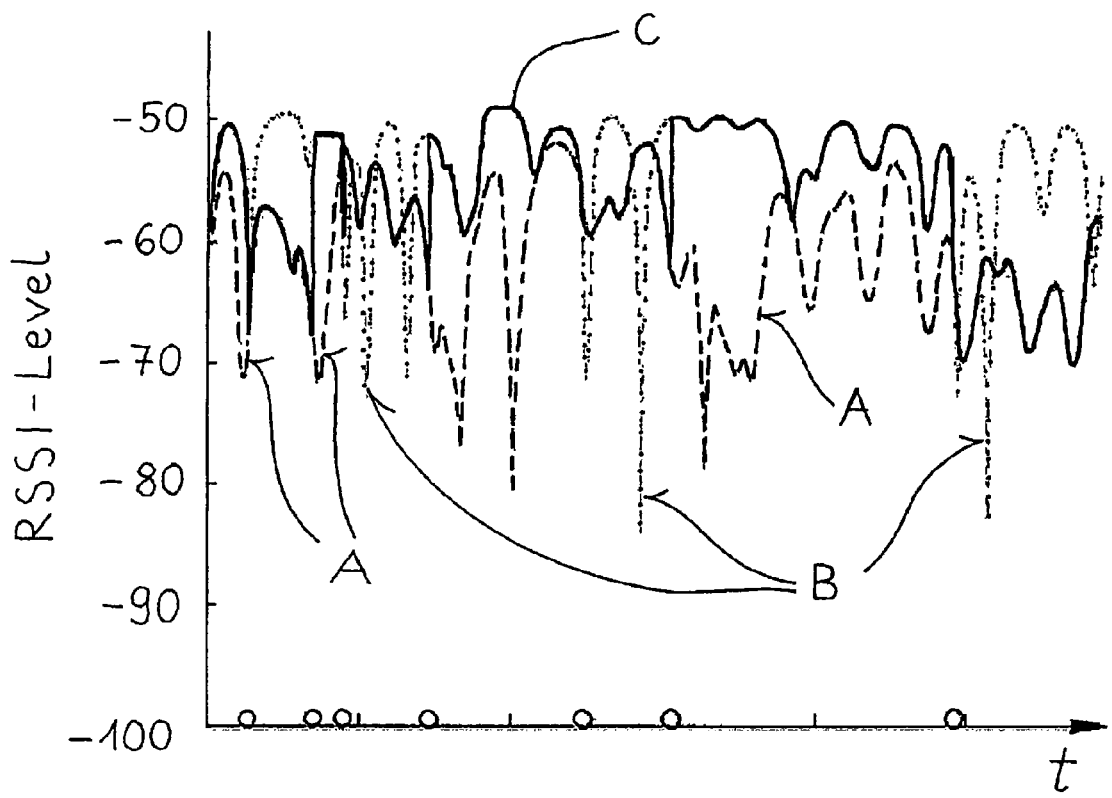
FIG. 1 shows time dependence of RSSI-levels of two antennas and antenna diversity.

A low cost diversity receiving system supports high quality transmissions and low power consumption at a low cost. The system provides a stable wireless connection between a wireless transmitter and receiver with a low dropout rate and high signal to noise ratios.

In each signal path, a current source supplies a variable signal level attenuator. The current source is connected to an amplifier through the variable signal level attenuator. The variable signal level attenuator has a controllable bypass line in parallel that comprises a variable resistive element.

The current source (e.g., constant or variable current source) may supply the variable signal level attenuator (which may comprise a pin-diode) and the amplifier. In this configuration, only one power source may be required. The current provided by the constant current source may flow through a pin-diode to the signal output of the amplifier. A pin-diode may be switched through the signal received from a corresponding antenna. The signal may be transmitted through a common path with the receiver. To disconnect the signal path from the common path the current that flows through the pin-diode may be reduced. This condition may increase the resistance of the device and switch off the diode. This may occur, for example, if the signal level of the individual signal path or if the receiver output signal falls below a threshold. A controllable bypass line connected in parallel to the variable signal level attenuator may achieve this condition. The bypass line may comprise variable resistance elements, (e.g. an electrical component that may vary resistance in response to a control signal).

The control signals that manage the controllable bypass line may be received through a feedback loop. A controllable current source may serve as a variable resistance element. The current source may comprise a component, whose internal resistance changes with current levels. Other systems include variable resistance elements that may comprise a switch, a potentiometer, a controlled diode, a transistor, or component having electrical resistivity that changes. Depending on the electrical conductivity of the variable resistance element, the bypass line may comprise three states: open, partially open, or closed. The current generated by the constant current source may be redirected through the variable resistance element and flow into the amplifier.

In operation, the amplifier may be deactivated after the diode is switched off. This may occur through the feedback loop that connects the control input of the amplifier. The feedback loop may adjust the operating point of the amplifier.

In some systems, variable resistance element comprises a controllable current source. The current source supplying the variable signal level attenuator may be connected within the controllable bypass line. The mutual influence of the two current sources, both comprising part of the bypass line, may change a current through the variable signal level attenuator while maintaining the current received at amplifier.

In some systems, the controllable bypass line is connected through a control line to at least one signal level detector. The signal level detector may be positioned in a common path or in each diversity signal path. The control line may be further connected to a control input of the amplifier.

A low pass filter may pass signals to the control input of the amplifier. The filter may facilitate control (e.g. switching the amplifier off or on, initiate a time-delay, etc.) with respect to the variable signal level attenuator.

Figure 2:
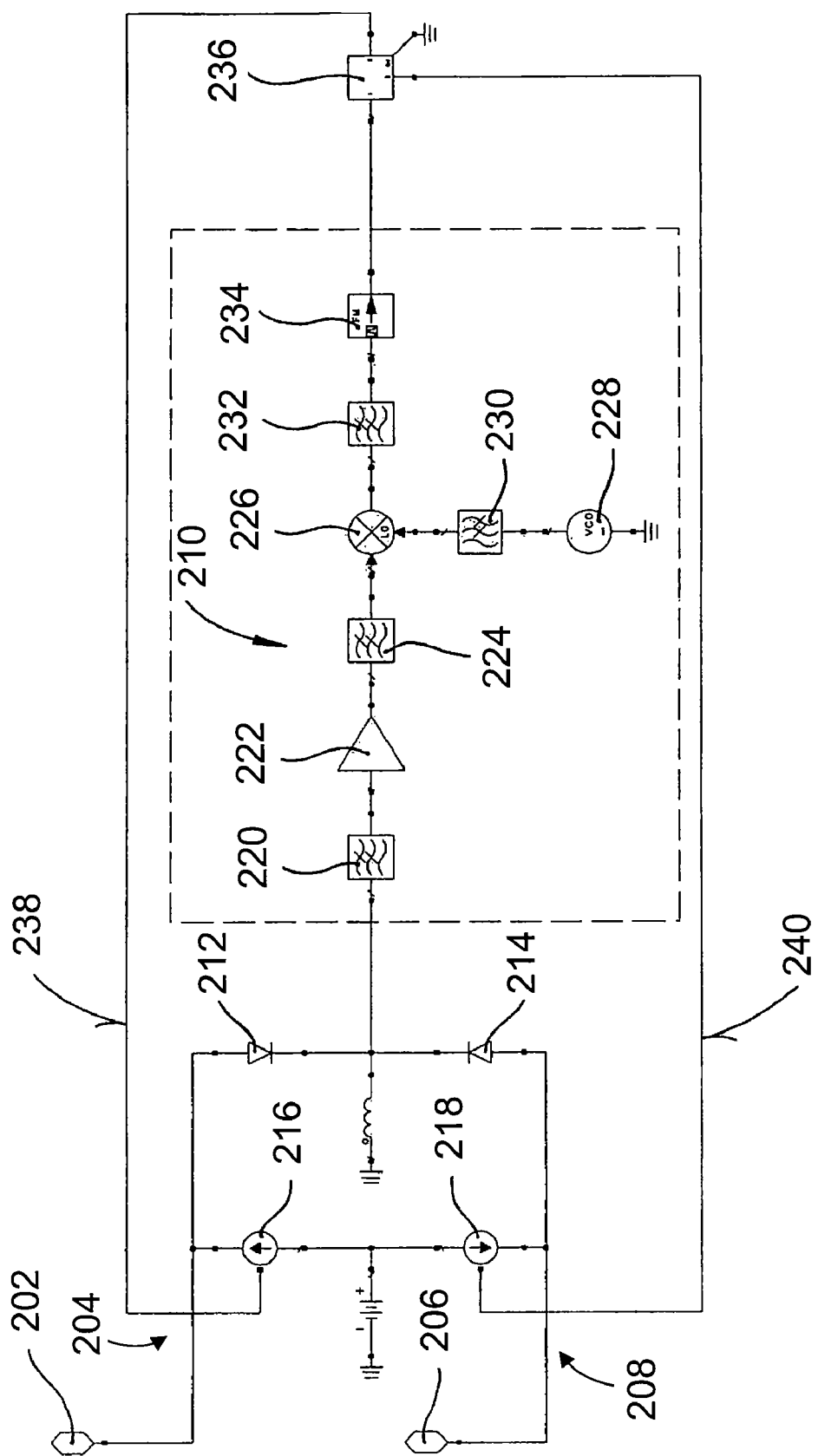
FIG. 2 is a block diagram of an antenna diversity system.

In some wireless systems an antenna switch is directly connected between the antennas and a Low Noise Amplifier AMP-A, as shown in FIG. 2. This configuration may improve transmission quality at a minimum cost. However, some systems may not be effective at mitigating dropouts especially in analog systems. The system of FIG. 2 includes two antennas 202, 206 and corresponding signal paths 204, 208 that terminate at a common path 210 through a mutual switching of two pin-diodes 212, 214. The paths source a common receiver. Each pin-diode 212, 214 is connected to a controllable current source 216, 218. The receiver comprises a band filter 220, an amplifier 222, a filter 224 and a mixer 226 that mixes the signal with a reference signal sourced by a voltage controlled oscillator (VCO) 228. The reference signal passes through a local oscillator-filter (LO-filter) 230. An intermediate frequency (IF) filter 232 and a demodulator 234 further processes the mixed signal. The receiver output signal level, for example the RSSI-value, may be measured with a signal level detector 236 and used to estimate the quality of the transmitted signal. If the signal level falls below a threshold, a control signal such as a constant voltage signal, for example, is generated by a microcontroller, that may be part of the signal level detector 236. Control signals for each signal path 204, 208 are transmitted through control lines 238, 240. The control lines control delivery of current from the current source 216, 218 and thus control the pin-diodes 212, 214.

FIG. 1 shows the time dependence of the RSSI-levels of two individual antennas and as the antenna diversity of the system of FIG. 2. Curve A (dashed) depict the RSSI-level of the signal coming from antenna 202, and curve B (dotted) depict the RSSI-level of the signal coming from antenna 206. Curve C (full line) shows the RSSI-level of the receiver output with antenna diversity. The circles on the time scale denote to the time of switching from one antenna to another. As seen from curve C, the quality of the transmission of the system of FIG. 2 does not avoid dropouts.

Figure 3:
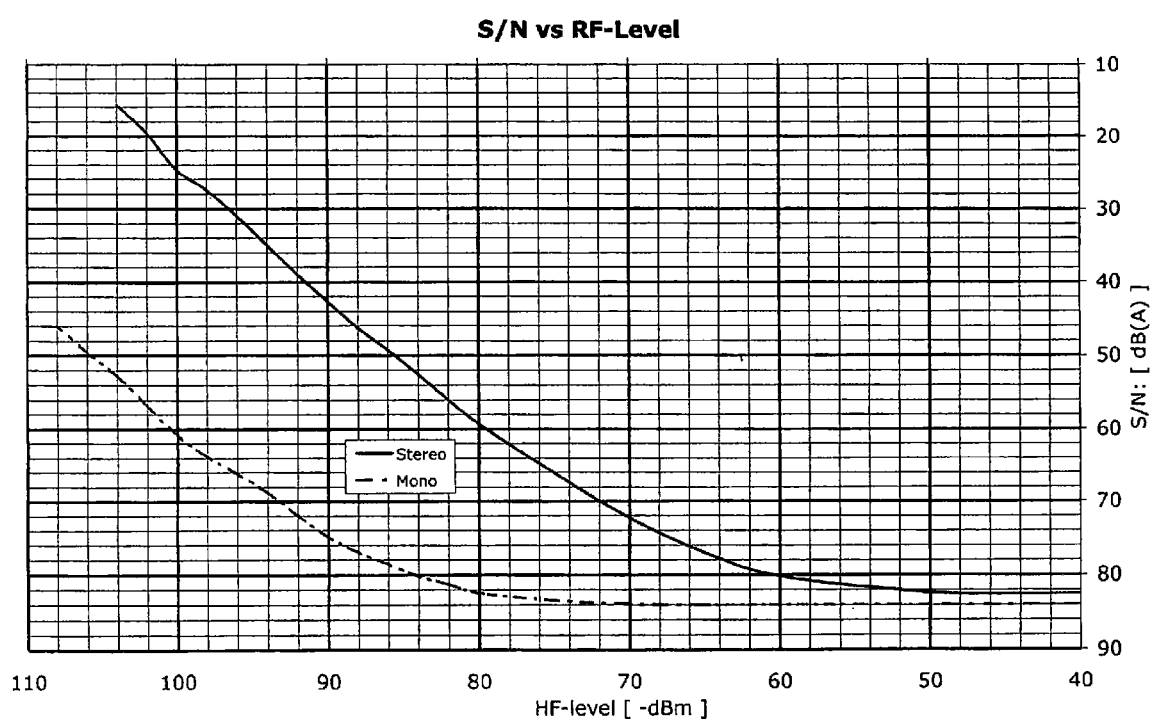
FIG. 3 is the SNR of a mono and stereo signal in dependence of the RF-level.

When switching devices are used, (e.g., in professional wireless systems), the systems may have an attenuation level of about 2 dB (e.g., PIN-diode use and diode-devices dependent). Attenuation may increase the noise figure, decrease the sensitivity, and decrease the acting range and the signal to noise behavior of the receiver. This may affect wireless-systems that facilitate ordinary analog (stereo) transmission to achieve the best signal to noise performance over the RF level and reach a high action radius. FIG. 3 shows the SNR in dependence of the RF-level for mono and stereo systems. In view of the figure to reach the same signal to noise behavior than a systems with analog mono transmission (lower curve), the curves the RF-level for wireless systems with analog stereo signal transmission (upper curve) may have to be more than about 20 dB higher. Because of this condition, no additional attenuation (PIN-diode-switch at the input) is desired to reach the highest signal to noise ratio.

Because of the limited AM-rejection of a demodulation circuit produces, the use of FET switches with low insertion losses may not be ideal. In its place, pin diodes may be used. With pin diodes, the RF signals may be blended by increasing or decreasing the current flow through the diodes. In these circuits, a compromise between switching time (which should be ideally about 0 seconds) and switching noise may be required. The structure and operation of PIN diode, is further described in "The PIN Diode Circuit Designer's Handbook", 1998, by Microsemi Corporation, Watertown, 580 Pleasant Street, Watertown, Mass. 02472 (accessible at http://www.microsemi.com/literature/pinhandbook.pdf), which is incorporated herein by reference.

The current required for the operation of the variable signal level attenuator, like a PIN diode or a Field Effect Transistor (FET), for example, may be used by the amplifier, for example LNA, operational amplifier, etc., because the optimal operation may be set to a current-flow. Because of this similarity, a PIN diode may be connected in series with the amplifier. The current consumption of the amplifier (e.g., stabilized by a current source) may switch the PIN-diode to minimum resistance. If the RF signal path should be deactivated, current flow may be redirected to the LNA over a parallel line to the pin-diode (bypass) rather than the pin-diode itself. In this configuration the resistance of the diode reaches a maximum and the signal of the corresponding antenna may be attenuated.

Figure 4:
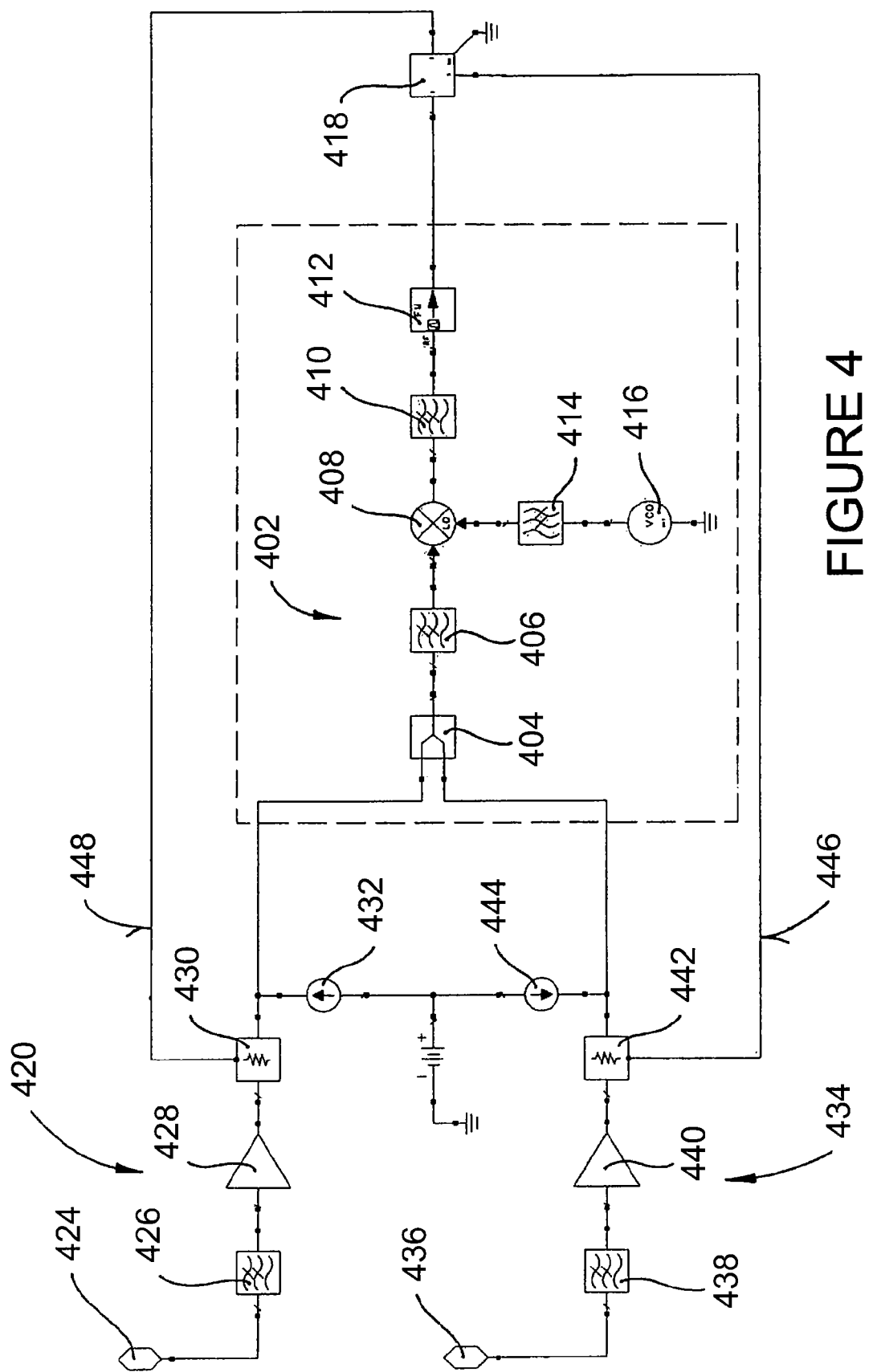
FIG. 4 is a block diagram of a diversity receiving system.

FIG. 4 is a diversity receiving device. It includes two or more antennas 424, 436 coupled to signal paths 420, 434 that terminate at a combiner 404 that feeds a common path 402. The common path includes a receiver, a filter, an amplifier, a decoder and demodulator (e.g., 406-416).

Since more than one signal paths may have the same structure, the following description may relate to some or each of the paths. In each signal path 420, 434, antenna 424, 436 is connected through a filter 426, 438 to the signal input of an amplifier 428, 440 having a signal output coupled to a signal input of a controllable attenuator 430, 442. The controllable attenuator 430, 442 (schematically shown) is connected with its signal output to a current source 432, 444.

Figure 6:
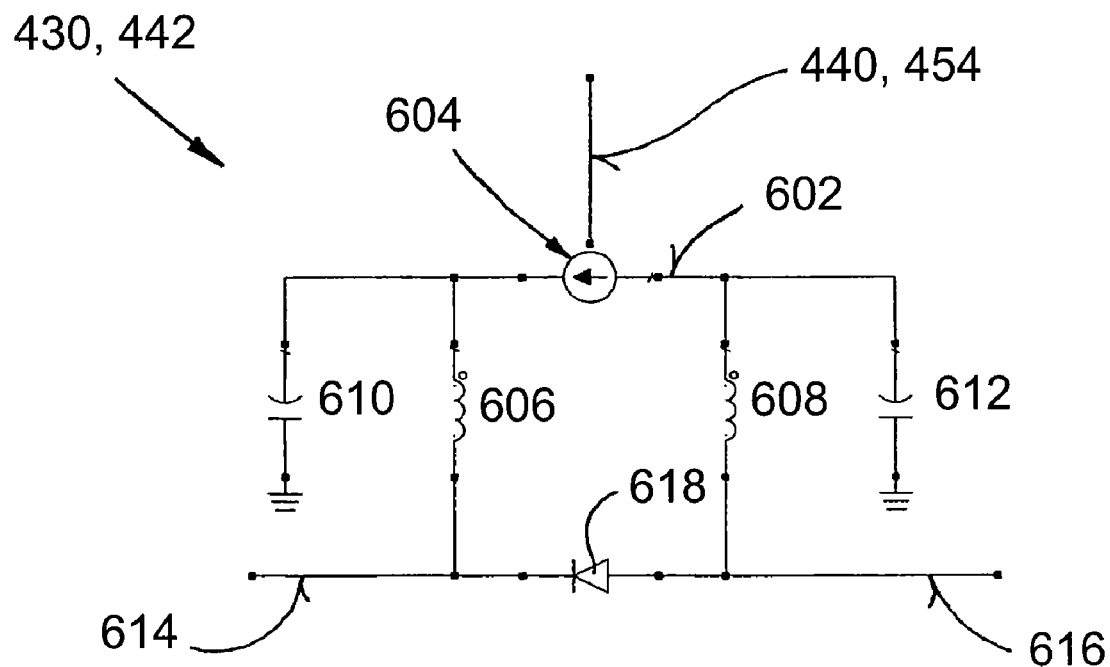
FIG. 6 is a block diagram of the variable signal level attenuator of FIG. 4.

FIG. 6 shows a controllable attenuator 430, 442, which may be controlled by the voltage delivered or through the signal input 614 and/or signal output 616 (e.g., point that receives current or voltage). The controllable attenuator 430, 442 of FIG. 6 comprises a variable signal level attenuator 618 (e.g., a pin-diode). Other variable signal level attenuators may be used, including a transistor, such as bipolar transistors or field effect transistors, other diodes, etc. A variable resistance element 604, which may comprise a voltage controllable current source, is connected in parallel to the variable signal level attenuator, thus providing a controllable bypass line 602. The diversity control signal generated through the signal level detector 418 (referring too FIGS. 4 and 6) by a micro controller is sourced through the control lines 448 and 446, respectively. The signal controls the variable resistance element 604 that may control the current-flow through the pin-diode (e.g., 618). Capacitors 610, 612 may act as an integrator during the switching process and with the inductors 606, 608 forms a (high) impedance input for the RF amplifier at a working frequency band.

The current source 432, 444 of FIG. 4 supplies both the variable signal level attenuator 618 and amplifier 428 or 440, respectively. This forms a galvanic connection between the amplifier 428 or 440 and the variable signal level attenuator 618. In FIG. 4 the current sources 432, 444 of the signal paths 420 and 444 may be sourced by a common power supply. The signal outputs of the controllable attenuators 430, 442 are coupled to a combiner 404 that combine the individual signal paths 420, 434 into a common path 402. A receiver is provided within the common path 402 and may have substantially the same structure as the receiver of FIG. 2. The receiver of FIG. 4 does not include the band filter 220 and amplifier 222, since these components are included in each signal path between antenna and controllable attenuator.

The output level of the receiver is measured as an RSSI level by the signal level detector 418, which transmits the signal level control signals through control lines 444, 446 to the controllable attenuators 430, 442. Some alternative systems use only one control line for both controllable attenuators 430, 442.

Figure 5:
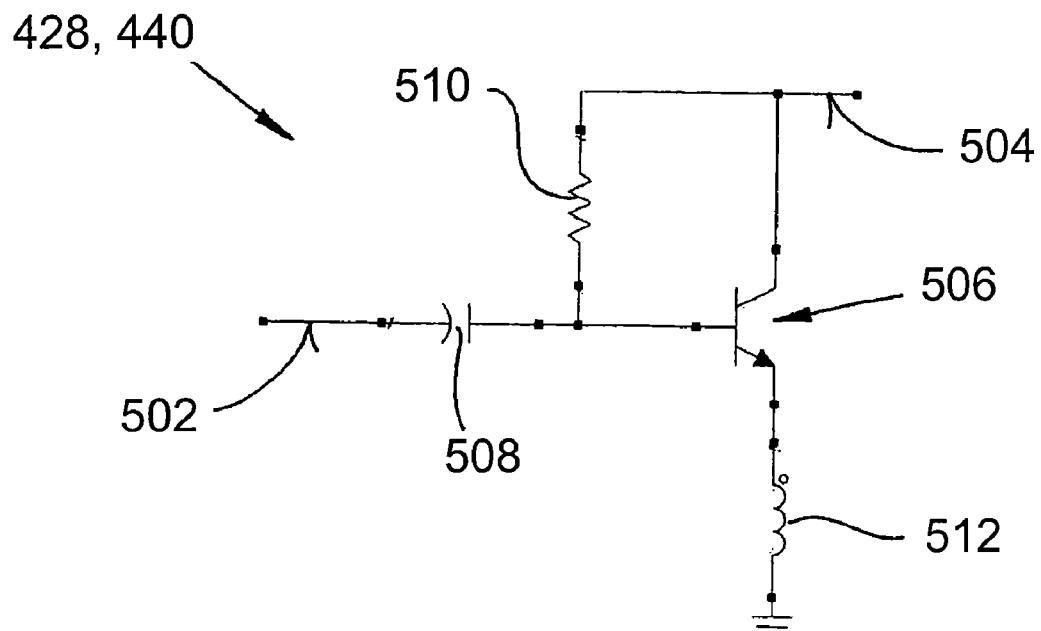
FIG. 5 is a block diagram of the amplifier of FIG. 4.

FIGS. 5 and 6 show a simplified structure of the input amplifier 428 and/or 440 that connect to the controllable attenuator 430,442. A bipolar-transistor may operate as an input amplifier, as shown in FIG. 5. The amplifier includes the signal input 502, a capacitor 508, a resistance 510, a bipolar transistor 506, an inductor (e.g., an inductivity) 512 and the signal output 504. In alternate systems, alternate amplifiers having different configurations or structures.

In some systems, when current source 432, 444 (shown in FIG. 4) supplies the pin-diode 618 (shown in FIG. 6), and also supplies the amplifier 428, 440, current flow through the pin-diode 618 may be set or alternated to a minimum. If the voltage of the diversity control signal rises (changes), the voltage controlled current source 604 may direct the current directly to the input amplifier 428, 440, respectively. This may cause the resistance of the PIN diode to increase the attenuation of the RF-signal.

To reduce the total current consumption further (and to reach substantially the same power consumption as in a non diversity system) some systems may operate (in FIGS. 7 and 8) as follows: after the pin-diode has switched off, the switching signal transmitted from the signal level detector 418 (time-delayed) may be used to switch off the input amplifier 428', 440'.

Figure 7:
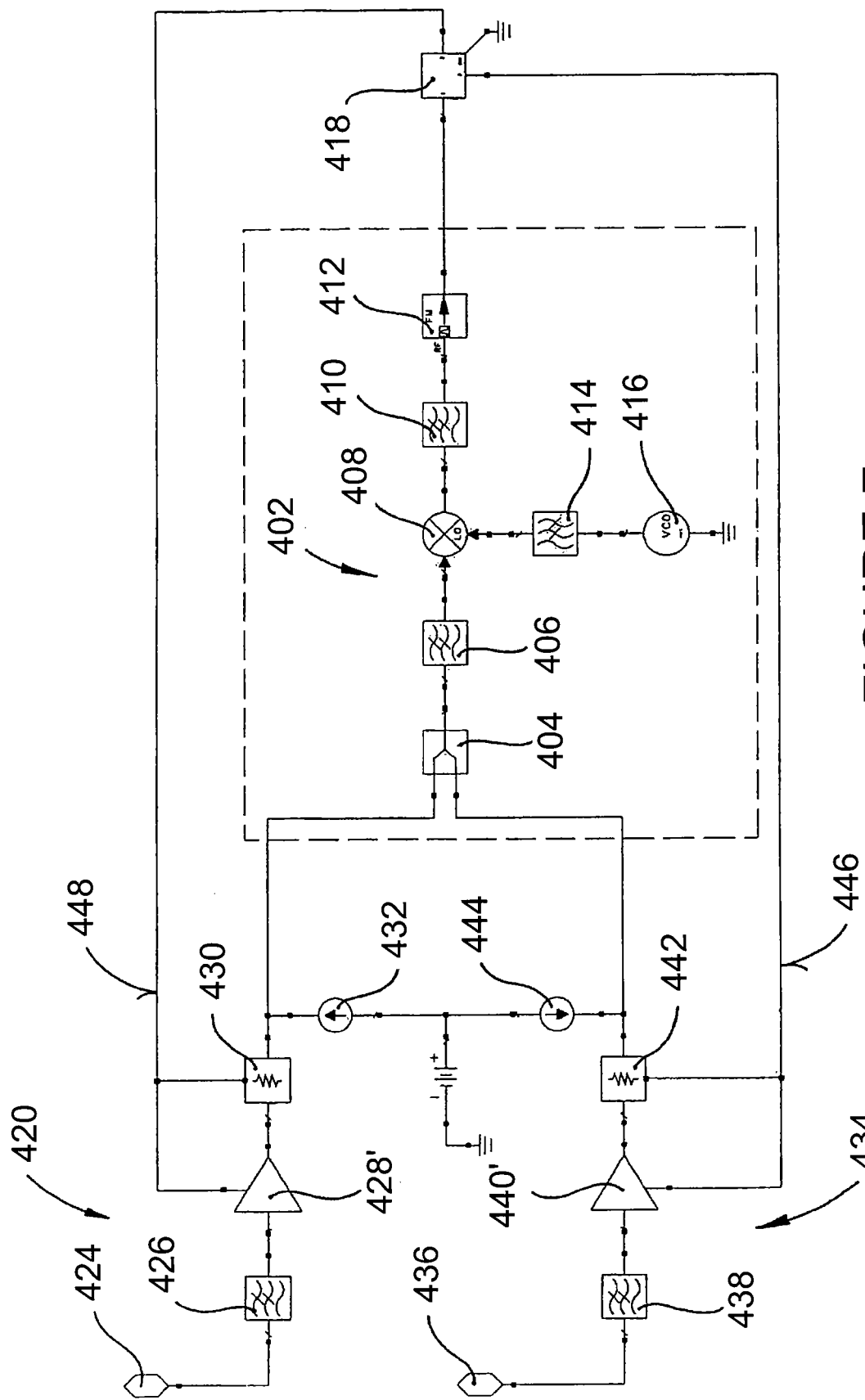
FIG. 7 is a block diagram of a diversity receiving system.

A comparison of the system shown in FIGS. 4 and 7 show the feedback line from the signal level detector 418 in FIG. 7 is not only connected with the controllable attenuator 430, 442, and with the amplifier 428, 440. The two control signals from the signal level detector 418 also switch the input amplifiers 428' and 440'. This may occur by shortening the base-voltage of the bipolar transistor to ground as is shown in amplifier 428', 440'.

Figure 8:
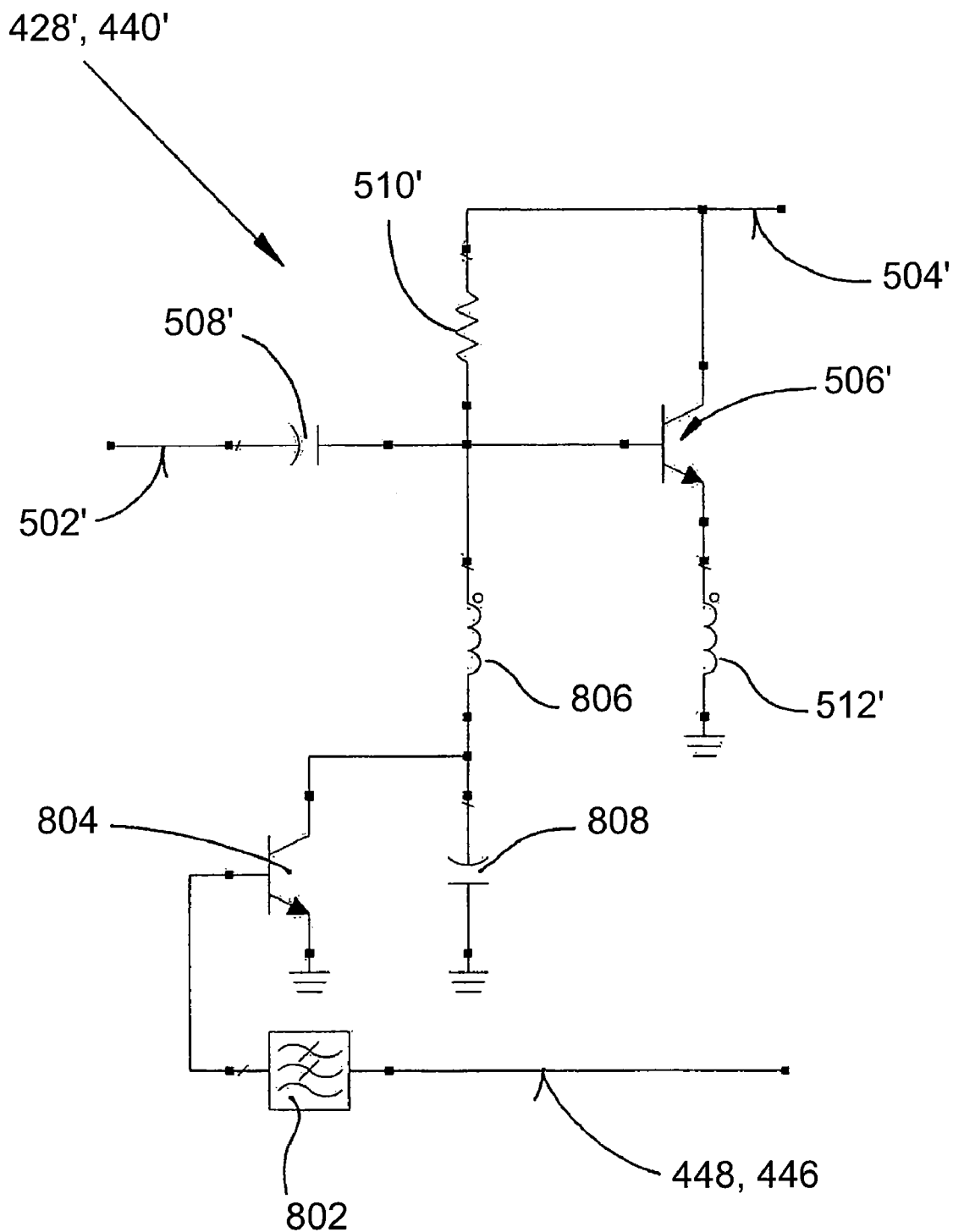
FIG. 8 is a block diagram of the amplifier of FIG. 7.

The amplifier, shown in FIG. 8, is a gain controlled amplifier with the signal input 502', the capacitor 508', the resistance 510', the bipolar transistor 506', the inductors 806 and 512', transistor 804 and capacitor 808 and the signal output 504'. In some applications the input amplifier should be switched off and time-delayed with regard to the variable signal level attenuator and switched on, before the variable signal level attenuator is switched on. This may occur through the low pass filter 802, being connected between the control line 448 or 446 and the base of transistor 804. The low pass filter 802 may comprise active and linear elements such as a resistor and a capacitor, having a larger time constant than the current sources. A difference when compared to other band-pass-filters may be that if the control signal changes from a high to a low state the capacitor of the low pass filter is discharged at a faster rate than it is charged. This may occur through a diode.

When the control voltage in the control line 448 or 446 increases and the pin-diode is switched off, the signal no longer passes to the receiver. Time delayed (caused by the low pass filter 802) the transistor 804 becomes conductive if the control-voltage rises higher than a characteristic threshold (case for example about 0.65V). This may occur when the base-current for the transistor-amplifier 506' is shorted to ground and the amplifier shuts down. In some systems, the voltage controlled current source 604 (FIG. 6) may comprise a bipolar transistor for low frequency applications, for example.

The current source 432 or 444 supplying pin-diode and amplifier stabilizes the input-amplifier. The voltage controlled current source used as variable resistance element 604 in the bypass line of the pin-diode, reduces the current flow through the PIN-diode when the switching signal coming from the micro-controller of the signal level detector 418 changes.

To deactivate the amplifier, (e.g. a low noise amplifier), when the PIN diode is switched off, the amplifier may be slowly turned off through a time-delay. Before the PIN-diode is activated again, the amplifier may be switched on faster than the PIN-diode.

Figure 9:
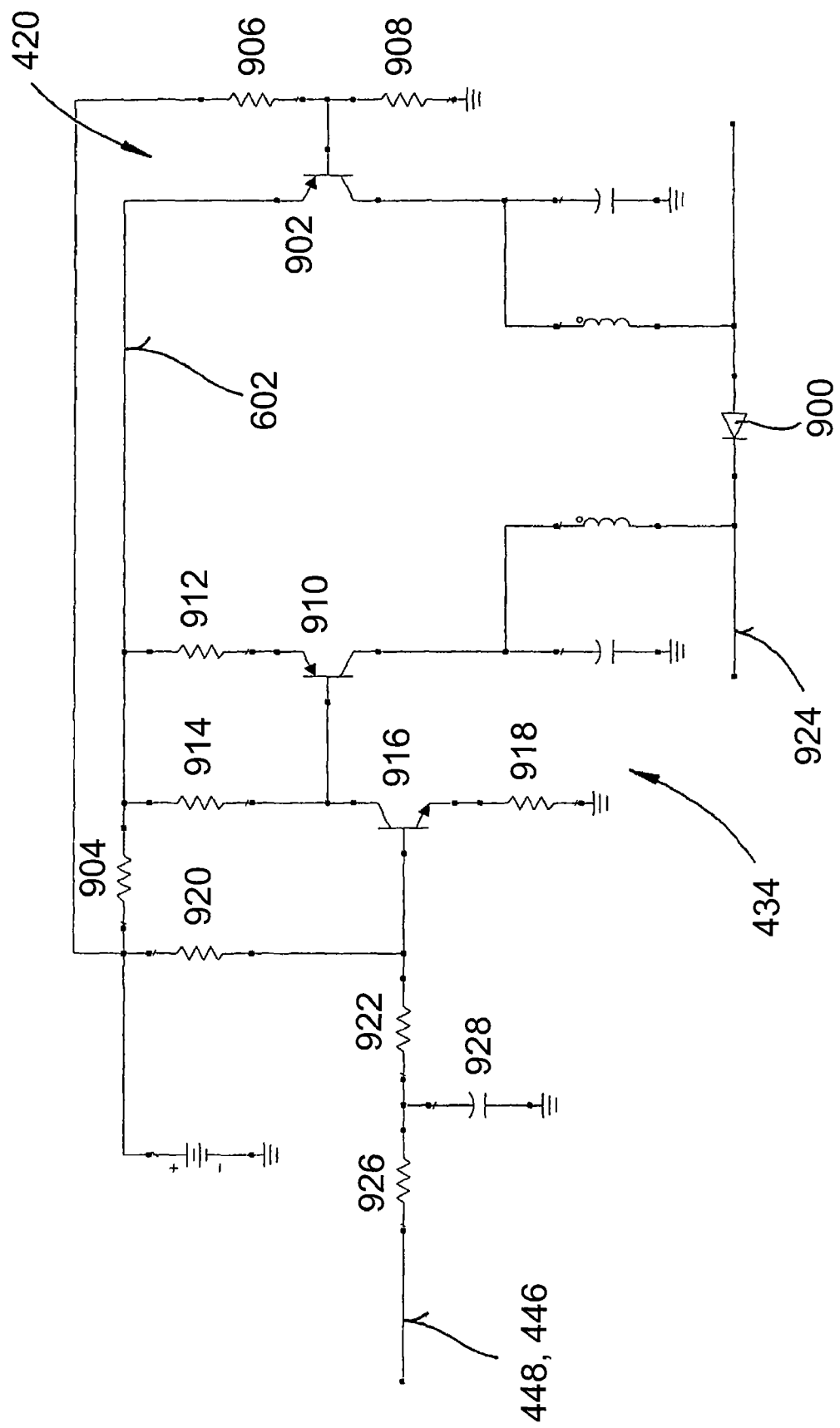
FIG. 9 is a block diagram of a controllable bypass line.

FIG. 9 shows a current source that supplies the variable signal level attenuator 618 integrated within a controllable bypass line 602 and a controllable current source for controlling the bypass line 602. In FIG. 9 two current sources 420, 434 may source the switching circuit (or pin diode) of the variable signal level attenuator. The first current source 420 (with regard to its function corresponding to current source 432 or 444 of FIG. 4 or 7) comprises transistor 902 and resistors 904, 906 and 908. The current source may supply the pin-diode and the amplifier when the bypass line is closed.

The second current source 434 may comprise a voltage controllable element that may comprise a transistor 910, resistors 912, 914, transistor 916, resistors 918, 920, and 922. The second current source 434, which is controlled by the control lines 448 or 446, respectively, corresponds to the function of the voltage controllable current source 604 of FIG. 6. In FIG. 9 both current sources 420, 434 are integrated within a bypass line 602 of the variable signal level attenuator 900. The two current sources 420, 434 are connected in parallel.

If a diversity control signal originating from a micro-controller of the signal level detector 418 through control line 446, 448 has a logical low value, the base-voltage at the transistor 916 is to low for switching. In this case the current source 434 built up by the transistor 910 stays in the OFF condition, which means that the complete current flowing through the variable signal level attenuator 900 and the amplifier (not shown in FIG. 9, but connected to the signal input 924) is generated by the current source 420 builds up by the transistor 902. If the voltage of the diversity control signal changes from logical low to a logical high, the voltage at the base of transistor 916 starts to increase (time-delayed through the low pass filter established by resistor 926 and capacitor 928), whereby the current sourced by the current source 434 build up by transistor 910 rises. For the overall current consumption (established by the components 902, 904, 906 and 908) to remain the same, transistor 902 becomes more resistive and the current flowing through the PIN-diode decreases until the transistor 910 has reached the point of saturation and no current flows through the PIN-diode.

The circuit of FIG. 9 makes it possible, to change the current flow through the variable signal level attenuator 618 while maintaining a constant current flow for the amplifier. The current flow through line 924 to which the amplifier is connected stays substantially constant regardless of the actual switching state of the variable signal level attenuator 618. In operation, the current through transistor 910 rises to the same extent as the current through transistor 902 decreases. As the transistor 910 decreases the resistivity of transistor 902 increases.

Instead of measuring the signal level at the output of the receiver part, it is also possible to measure the signal level in each diversity signal path and to use this information to select an appropriate antenna having the larger signal level in alternate systems. This alternative system may be achieved by a coupling line for each signal path or by U.S. Pat. No. 5,697,075, which is incorporated by reference. The signal paths are inductively coupled with a separate line serving to determine or estimate the actual signal level. A comparator comparing the two signals sends a control signal to the control line thereby activating or deactivating the variable signal level attenuator of a corresponding signal path.

The systems provide a power supply that sources an amplifier and the variable signal level attenuator in each signal path, which reduces power consumption. The diversity receiving device may receive many signals, such as mono, stereo and multi-channel signals, in an analog and/or digital format.

The system may interface, integrated, or form a unitary part of mobile phones, portable pocket receiver, GPS-receiver, in ear monitoring systems, vehicle applications (radio receiver, phone, etc.), wireless transmission systems between computers, workstations, etc.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A diversity receiving device having at least two signal paths each comprising:
   an antenna that receives a radio frequency signal;
   an amplifier that amplifies the received radio frequency signal;
   a variable signal level attenuator that attenuates the amplified signal; and
   a current source that supplies the variable signal level attenuator;
   where the at least two signal paths are combined and are continuous with a common path;
   where in each of the at least two signal paths, the current source is coupled to the amplifier through the variable signal level attenuator; and
   where the variable signal level attenuator is in parallel with a controllable bypass line which comprises a variable resistance element.

2. The diversity receiving device according to claim 1 where the variable signal level attenuator comprises a pin-diode.

3. The diversity receiving device according to claim 2 where the controllable bypass line is coupled through a control line to at least one signal level detector.

4. The diversity receiving device according to claim 3 where the signal level detector is coupled within the common path.

5. The diversity receiving device according to claim 3 where the signal level detector is coupled within each diversity signal path.

6. The diversity receiving device according to claim 2 where the variable resistance element comprises a controllable current source.

7. The diversity receiving device according to claim 6 where the current source supplies a current to the variable signal level attenuator and is coupled within the controllable bypass line.

8. The diversity receiving device according to claim 7 where the controllable bypass line is coupled through a control line to at least one signal level detector.

9. The diversity receiving device according to claim 6 where the controllable bypass line is coupled through a control line to at least one signal level detector.

10. The diversity receiving device according to claim 9 where the signal level detector is coupled within the common path.

11. The diversity receiving device according to claim 9 where the signal level detector is coupled within each diversity signal path.

12. The diversity receiving device according to claim 1 where the variable resistance element comprises a controllable current source.

13. The diversity receiving device according to claim 12 where the current source supplies a current to the variable signal level attenuator and is coupled within the controllable bypass line.

14. The diversity receiving device according to claim 13 where the controllable bypass line is coupled through a control line to at least one signal level detector.

15. The diversity receiving device according to claim 12 where the controllable bypass line is coupled through a control line to at least one signal level detector.

16. The diversity receiving device according to claim 15 where the signal level detector is coupled within the common path.

17. The diversity receiving device according to claim 15 where the signal level detector is coupled within each diversity signal path.

18. The diversity receiving device according to claim 1 where the controllable bypass line is coupled through a control line to at least one signal level detector.

19. The diversity receiving device according to claim 18 where the signal level detector is coupled within the common path.

20. The diversity receiving device according to claim 18 where the signal level detector is coupled within each diversity signal path.

21. The diversity receiving device according to claim 18 where the control line is coupled to a control input of the amplifier.

22. The diversity receiving device according to claim 21 further comprising a low pass filter coupled to a control input of the amplifier.

* * * * *

UNITED STATES PATENT AND TRADEMARK OFFICE
CERTIFICATE OF CORRECTION

| | | |
|---|---|---|
| PATENT NO. | : 8,086,201 B2 | Page 1 of 1 |
| APPLICATION NO. | : 12/487024 | |
| DATED | : December 27, 2011 | |
| INVENTOR(S) | : Heinrich Kofler | |

It is certified that error appears in the above-identified patent and that said Letters Patent is hereby corrected as shown below:

On the Title Page, Item (86)

The priority claim does not appear on the face of the issued patent, please insert the priority claim which appears in the specification as:

--International Application No. PCT/EP2006/012228, filed Dec. 19, 2006.--

Signed and Sealed this
Fourteenth Day of February, 2012

David J. Kappos
*Director of the United States Patent and Trademark Office*